United States Patent
Lapatovich

(10) Patent No.: US 6,566,817 B2
(45) Date of Patent: May 20, 2003

(54) HIGH INTENSITY DISCHARGE LAMP WITH ONLY ONE ELECTRODE

(75) Inventor: Walter P. Lapatovich, Boxford, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/961,575

(22) Filed: Sep. 24, 2001

(65) Prior Publication Data

US 2003/0057882 A1 Mar. 27, 2003

(51) Int. Cl.⁷ .................................................. H01J 1/52
(52) U.S. Cl. .................... 315/85; 315/60; 315/39.53; 313/492; 313/607; 313/635
(58) Field of Search ................ 315/39.53, 39.55, 315/60, 85, 267, 344, 248; 313/634, 637–643, 484, 491, 492, 571, 574, 576, 596

(56) References Cited

U.S. PATENT DOCUMENTS

| | | | |
|---|---|---|---|
| 3,868,528 A | * 2/1975 | Lake et al. | 174/50.61 |
| 4,360,758 A | * 11/1982 | Thornton, Jr. et al. | 313/27 |
| 4,686,419 A | 8/1987 | Block et al. | 313/641 |
| 4,998,036 A | 3/1991 | Matsuura et al. | 313/25 |
| 5,051,657 A | * 9/1991 | Bazin et al. | 315/49 |
| 5,107,185 A | 4/1992 | El-Hamamsy et al. | 315/248 |
| 5,498,928 A | * 3/1996 | Lapatovich et al. | 315/248 |
| 5,621,275 A | 4/1997 | Wei et al. | 313/636 |
| 5,682,082 A | 10/1997 | Wei et al. | 313/636 |
| 5,691,601 A | 11/1997 | Frey et al. | 313/571 |
| 5,818,167 A | * 10/1998 | Lapatovich et al. | 313/484 |
| 5,825,132 A | * 10/1998 | Gabor et al. | 315/248 |
| 5,889,368 A | 3/1999 | Doell et al. | 313/637 |
| 5,955,840 A | 9/1999 | Arnold et al. | 313/637 |
| 6,104,145 A | 8/2000 | Olsen et al. | 315/246 |

FOREIGN PATENT DOCUMENTS

EP 1089322 A1 4/2001

OTHER PUBLICATIONS

Osram Sylvania Inc., Product Catalog, Metal Halide Lamps for Video Projectors (1996).
Ushio America, Inc., Product Specification Sheet, Metal Halide Lamp, MHR–100D & MHR–1000/HR.
Welch Allyn, Lamp Data Sheet, Hi–Lux Lamps.
Edmund Scientific, Product Catalog, Neosphere—9 Plasma Globe.
Fusion Lighting Inc., Preliminary OEM Datasheet, Bytelight, (Jan. 1999).
Schnedler et al., Ultrahigh–Intensity Short–Arc Long–Life Lamp System, SID 95 Digest, SID International Symposium (vol. XXVI), pp. 131–134 (1995).

* cited by examiner

Primary Examiner—Haissa Philogene
(74) Attorney, Agent, or Firm—Robert F. Clark

(57) ABSTRACT

A high intensity discharge (HID) lamp includes a starting gas, a vaporizable fill, and only one electrode sealed within a light transmissive envelope. The one electrode produces a high intensity discharge during operation of the lamp and is connected to an inlead that extends outside the sealed envelope. A ground for electric field lines emanating from the electrode during operation of the lamp is outside the envelope. The ground may be a reflector for the lamp that has an electrically conductive surface. The high intensity discharge is initiated by applying high frequency power to the inlead.

26 Claims, 5 Drawing Sheets

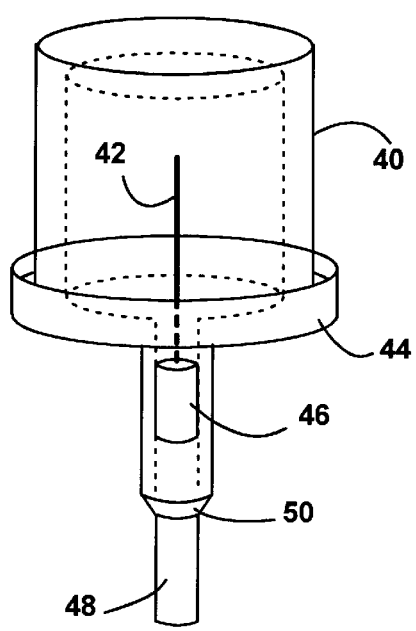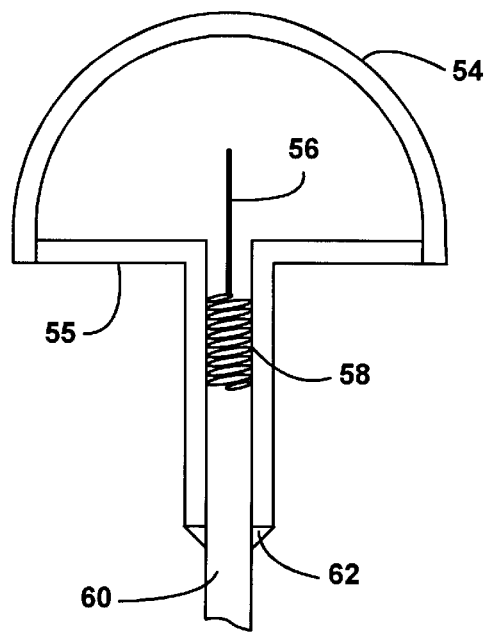
FIG. 8  FIG. 9
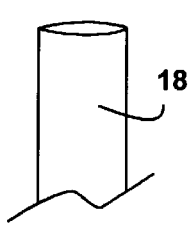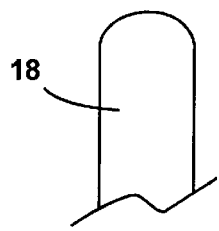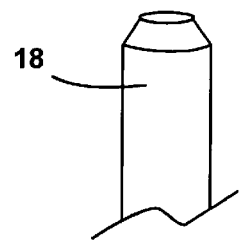
FIG. 10a  FIG. 10b  FIG. 10c

HIGH INTENSITY DISCHARGE LAMP WITH ONLY ONE ELECTRODE

BACKGROUND OF THE INVENTION

The present invention is directed to high intensity discharge (HID) lamps, and more particularly to compact HID lamps with short arc lengths that are mated with a reflector.

Compact HID lamps are used for a variety of purposes, including projecting video and data and injecting light into an optical light guide. Various types of compact HID lamps are known, for example see U.S. Pat. Nos. 5,691,601 and 4,686,419, which are incorporated by reference. All of these lamps have two electrodes whose separation defines the arc gap in the lamp. Compact HID lamps have an arc gap on the order of one to several millimeters.

Compact HID lamps are not without problems. The amount of light is less than expected. While there are hot spots immediately in front of the electrodes where high luminance regions exist, much light comes from the less intense, remainder of the arc gap. As arc gap length is reduced, light from the latter source is reduced. Further, as the size of the arc gap is reduced, lamp efficiency deteriorates because of heat build-up. In addition, the electrodes cause shadows and interfere with optical coupling. In an effort to reduce shadowing, the electrodes are often tapered. This can cause very high electrode tip temperatures and melting.

SUMMARY OF THE INVENTION

An object of the present invention is to provide a novel HID lamp that avoids one or more of these problems by using only one electrode sealed in the lamp's light transmissive envelope.

Another object of the present invention is to provide a novel HID lamp that includes a sealed, light transmissive envelope, a powered, high intensity discharge-producing electrode sealed within the envelope, and a ground electrode outside the envelope.

A further object of the present invention is to provide a novel HID lamp that includes a starting gas, a vaporizable fill, and only one electrode sealed within a light transmissive envelope, where the lamp is mated with a reflector that has an electrically conductive surface that is a ground for electric field lines emanating from the powered electrode during operation of the lamp.

A yet further object of the present invention is to provide a novel method of operating a HID lamp by applying high frequency power to a powered electrode that is the only electrode sealed in the lamp's light transmissive envelope to cause an arc discharge in the envelope, and grounding electric field lines from the electrode to a conductive surface that is adjacent to the envelope.

BRIEF DESCRIPTION OF THE DRAWINGS

FIG. 8 is a pictorial representation of a fourth (cylindrical) embodiment of the HID lamp of the present invention.

FIG. 9 is a cross-section of a fifth (hemispherical) embodiment of the HID lamp of the present invention.

FIGS. 10*a–c* are pictorial representations of alternative embodiments of the tip of the powered electrode in the lamp of the present invention.

DESCRIPTION OF THE PREFERRED EMBODIMENTS

Figure 1:
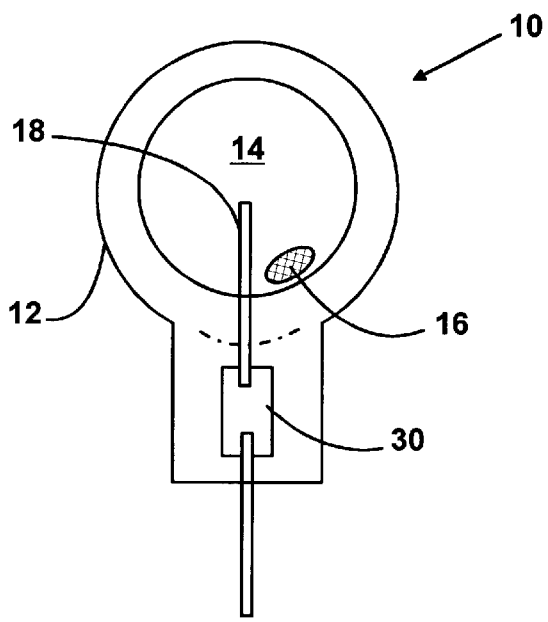
FIG. 1 is a pictorial representation of a first embodiment of the HID lamp of the present invention.

With reference now to FIG. 1, a first embodiment of the present invention is an HID lamp 10 that includes a sealed, light transmissive envelope 12 with a starting gas 14 and a vaporizable fill 16 sealed therein. Only one electrode 18 is sealed within envelope 12.

Figure 2:
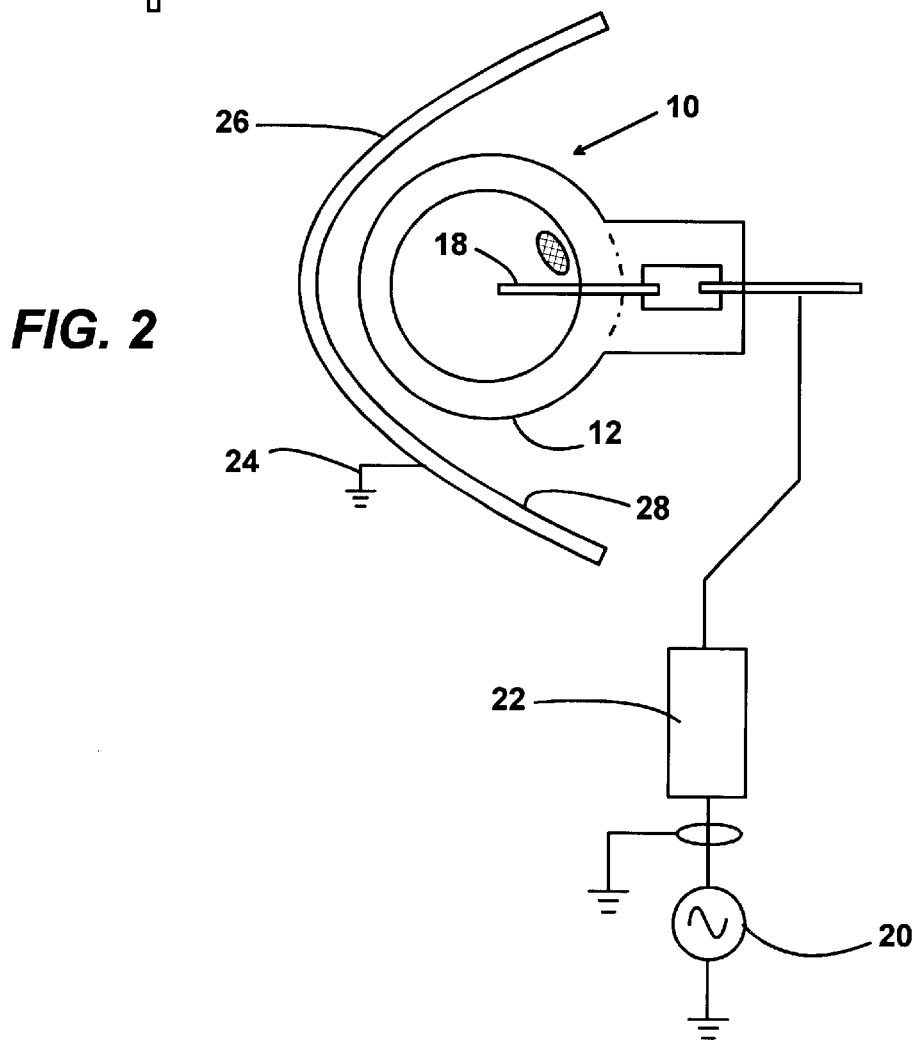
FIG. 2 is a pictorial representation of an embodiment of the combination of the HID lamp and reflector of the present invention.

With reference to FIG. 2, electrode 18 of lamp 10 may be connected to a source of high frequency power 20. A frequency provided by source of power 20 is preferably 2 MHz to 6 GHz. A tuning element 22 may be provided to match lamp impedance as impedance changes as the discharge transitions from glow to arc during warm-up of the lamp.

A ground 24 may be provided adjacent to envelope 12. Ground 24 may be part of a surface 26 of a reflector with an interior reflective surface 28 that reflects light emanating from envelope 12. Ground 24 may be a metal, a conductive ceramic, a metal impregnated with ceramic, metallized ceramic, or a conductive coating such as indium tin oxide (ITO). Ground 24 functions as a second electrode for the lamp by providing a definitive termination for electric field lines emanating from electrode 18 that is the only electrode that is powered during operation of the lamp.

During operation of lamp 10, high frequency power is applied to electrode 18 to cause an arc discharge in envelope 12, and electric field lines emanating from electrode 18 are grounded at ground 24 that is adjacent to envelope 12. The discharge is capacitively coupled through envelope 12. Initially, residual electrons are accelerated by the electric field at the tip of electrode 18 and produce ionization and excitations near the electrode tip. Eventually, thermionically emitted electrons from electrode 18 sustain the discharge. Operating pressure in envelope 12 is preferably adjusted so that collision frequency is high and so that electrons do not move far from the tip of electrode 18, which keeps gas heating and excitation localized near the tip. This causes light to be emitted from a small region of plasma near the tip of electrode 18 in order to achieve a confined arc.

Figure 3:
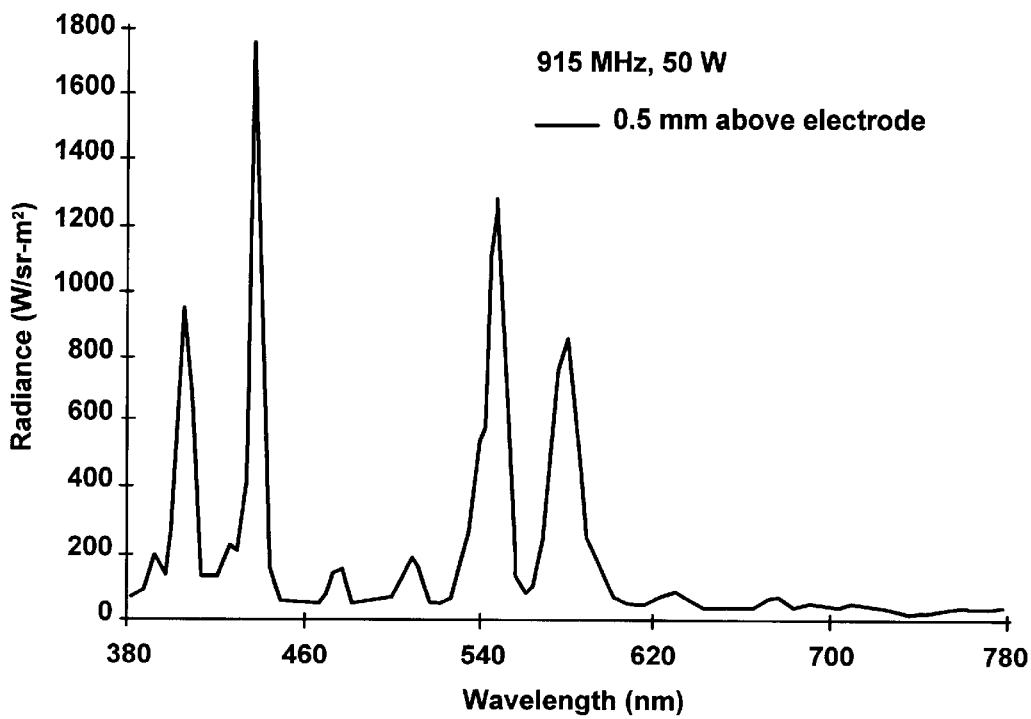
FIG. 3 is a graph of radiance versus wavelength for a 50 W, 915 MHz embodiment of the HID lamp of the present invention.

Experiments at 915 MHz and 50 Watts with sodium scandium salt and a mercury and argon fill show that the arc is small, typically no more than 0.5 mm above the tip of electrode 18, and provides an output of about 22 cd/mm$^2$ that is better than the 15–18 cd/mm$^2$ from comparable halogen lamps. By way of example, a plot of radiance versus wavelength at 915 MHz and 50 Watts for a single electrode lamp of the first embodiment is provided in FIG. 3.

Figure 6:
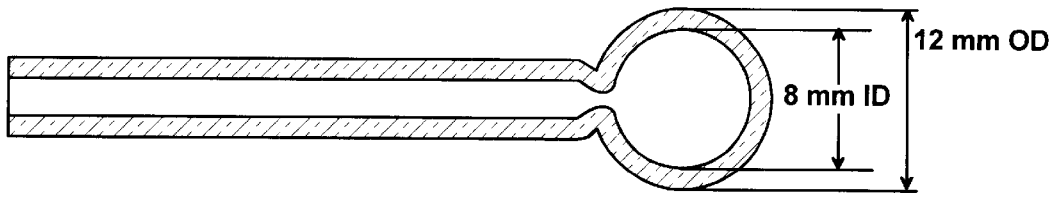
FIGS. 6 and 7 are cross-sections of spherical vitreous silica envelopes for lamps of the present invention showing exemplary dimensions.
Figure 7:
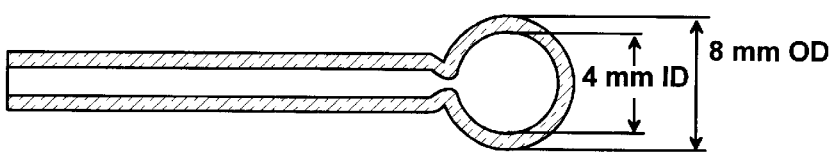
Figure 4:
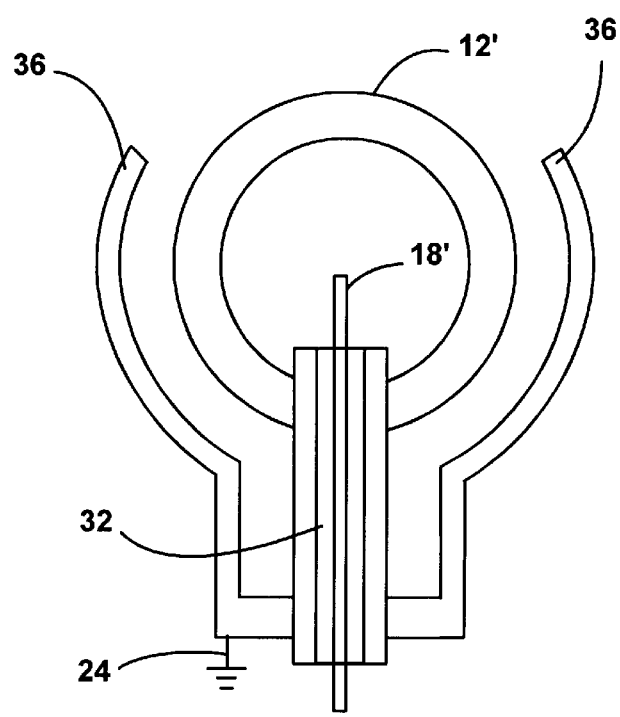
FIG. 4 is a pictorial representation of a second embodiment of the HID lamp of the present invention.
Figure 5:
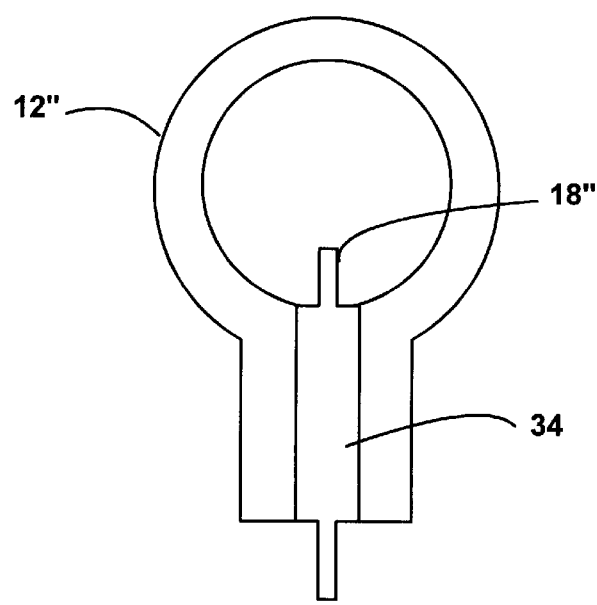
FIG. 5 is a pictorial representation of a third embodiment of the HID lamp of the present invention.

In further embodiments, envelope 12 may be substantially spherical and be made of vitreous silica (quartz) and sealed with a foil seal 30 (FIG. 1). As shown in FIG. 4, envelope 12' may be a ceramic and electrode 18' sealed with a frit seal 32. As shown in FIG. 5, envelope 12" may a ceramic with cermet assembly 34 for sealing electrode 18" in envelope 12". FIGS. 6 and 7 show two particular vitreous silica envelope dimensions and shapes from which operating lamps were made.

Envelope shapes other than spherical are also feasible. FIG. 8 shows a lamp with an envelope 40 that is generally cylindrical. Envelope 40 may be a single crystal sapphire with a sealed end plug that has been grown (such as discussed in U.S. Pat. No. 5,621,275). A single electrode 42 in envelope 40 is the powered electrode (the ground electrode outside the envelope is not shown). Envelope 40 may be held in a polycrystalline alumina (PCA) cap 44 and electrode 42 may be connected through cermet assembly 46 to inlead 48 (e.g., niobium) that is frit-sealed 50. FIG. 9 shows a cross-section of a lamp with a hemispherical envelope 54 that may be made from PCA. A single electrode 56 in envelope 54 is powered (the ground electrode outside the envelope is not shown). Envelope 54 may have a PCA bottom 55. Electrode 56 may be within a coil (e.g., molybdenum) 58 and connected to inlead 60 that is frit-sealed 62. In the above, suitable ceramics other than PCA may be used.

Starting gas 14 may be an inert gas, preferably neon, argon, krypton, xenon, or mixtures thereof, and vaporizable fill 16 may be mercury or a suitable substitute is the lamp is to be mercury-free. For example, vaporizable fill 16 may be a volatizeable fill, such as sulfur, selenium, tellurium, or mixtures thereof, or a high vapor pressure salt, such as sodium metal salts and iodides of zinc, cadmium, thallium, aluminum, gallium, or indium. Other metal salts may also be used as is common in the art. For example, such salt compositions may be $NaI.ScI_3$ or $DyI_3.HoI_3.TmI_3.CaI_2.NaI.TlI$ and other permutations. For example, in one test embodiment the fill included only Hg, Ar, and small amount of Br. Fills suitable for video projection might be based on Al, In, and Th as suggested in U.S. Pat. No. 5,889,368.

Electrode 18 may be a refractory metal, such as tungsten that may include additives of rhenium, iridium, osmium, or thorium oxide. Alternatively, electrode 18 may be a ceramic such as titanium nitride. A tip of electrode 18 is approximately in a center of envelope 12.

A tip of the powered electrode 18, 18', 18", 42, 56 may be shaped to enhance the electric field strength locally. For example, instead of a flat tip (FIG. 10a), the tip may be rounded (FIG. 10b) or tapered (FIG. 10c). Power desposition at the tip as a function of volume is $dP/dV=\sigma E^2$, where E is electric field magnitude and $\sigma$ is electrical conductivity. Near the thermionic tip of the powered electrode, $\sigma$ and E are both very high because of the concentration of the field at the tip. A sharp tip increases the concentration.

Fill gas cold pressure can be in the range of 1 torr to 10 atmospheres, with higher pressure forcing the arc to remain close to the electrode tip.

Ground 24 may be a suitable electrically conductive surface, such as the surface 26 of the reflector shown in FIG. 2 or a shield 36 for the lamp such as shown in FIG. 4, by way of example.

The high frequency excitation provided by source of power 20 may be sinusoidal, pulsed, square wave, or combinations thereof. The frequency is preferably within one of the bands allocated for lighting use, such as the band near 2.65 MHz or one of the ISM bands such as the one centered at 2.45 GHz. Power can be adjusted as the lamp warms up and fill 16 vaporizes until steady state is achieved. Voltage may be increased by using a suitable transformer. For example, a 30 MHz toroid transformer and a 180 MHz air transformer were used in test embodiments.

In a further embodiment, the high frequency may be amplitude modulated. For example, the lamp may be operated with a 2.45 GHz carrier amplitude modulated with a frequency of a few to hundreds of kilohertz. Operation at selected frequencies excites acoustic modes in the lamp that appear to have a stabilizing effect on the discharge.

The amplitude modulation may be swept, such as suggested by Olsen and Moskowitz in U.S. Pat. No. 6,104,145. When the modulation is swept (e.g., 20% modulation from 19–39 kHz every 10–50 ms), the tree-shaped arc straightens and constricts into a column of plasma directly above the electrode that increases luminance. Measured spot luminance for a mercury/argon lamp is over 200 $cd/mm^2$ at 50 Watts and 2.45 GHz when such "acoustic modes" are used. Further, the acoustic modes stabilize the arc and prevent wiggle, both of which desirable in compact HID lamps.

Tuning elements 22 may be active or passive. Passive elements may be tuning stubs or bimetal tuning elements along a coaxial line connecting source of power 20 with the lamp. Active elements may be PIN diodes that are actively biased to change impedance as the lamp warms up. The bias may change under the influence of active feedback from a photodiode that monitors lamp output or simply may be set to change with time based on the known warm-up characteristics of the lamp.

Figure 11:
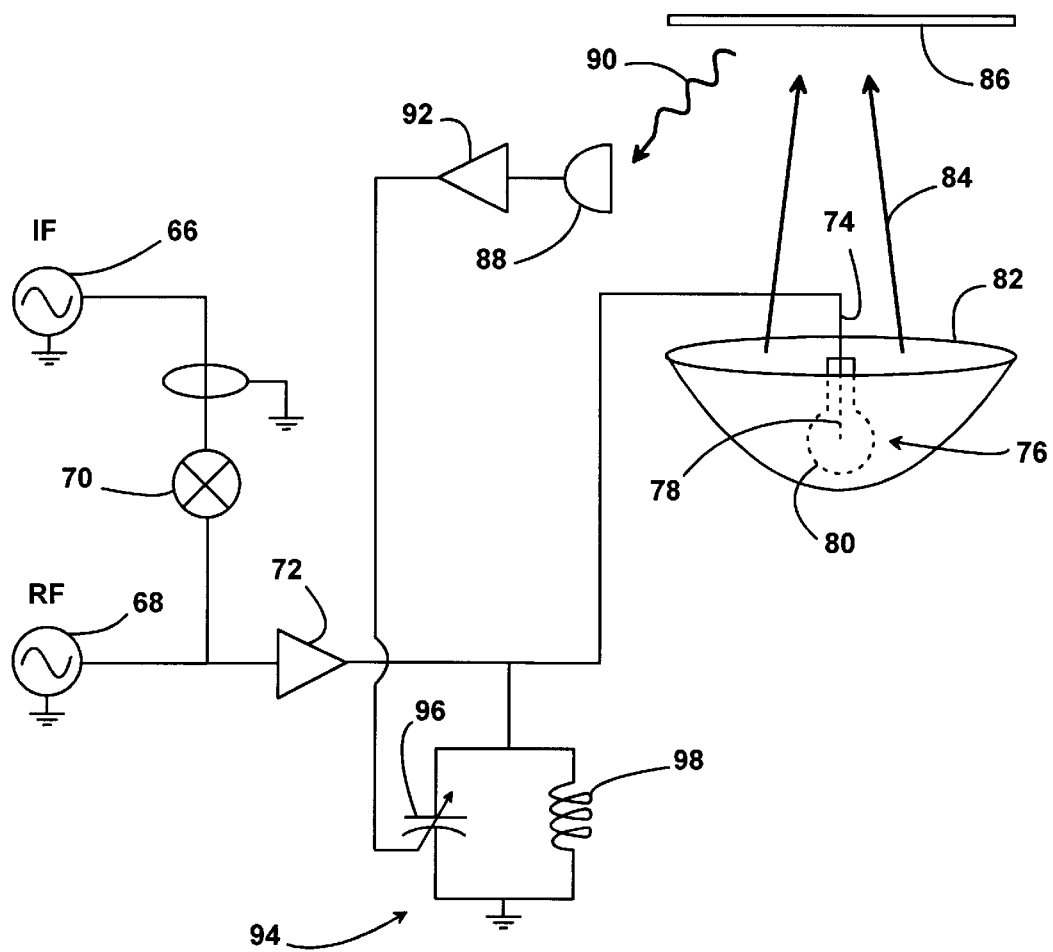
FIG. 11 is a diagram of an arrangement of a swept modulation, active feedback circuit and lamp of the present invention that is suitable for projector applications.

FIG. 11 is a diagram of an arrangement of a swept modulation lamp with active feedback for tuning and rapid warm-up. This arrangement may be particularly suitable for projector applications. Swept modulation source 66 provides an intermediate frequency and carrier source 68 provides a radio frequency. The intermediate frequency is provided to mixer 70 and the radio frequency is provided to mixer 70 and to power amplifier 72. The output of power amplifier 72 is provided to inlead 74 of lamp 76 that includes only one powered electrode 78 in light transmissive envelope 80. Reflector 82 may be glass with a dielectric coating inside and a conductive coating outside (e.g., metallized) that functions as a ground electrode outside envelope 80. Light from the lamp discharge is reflected 84 to an information gate 86, such as a liquid crystal, digital micromirror device, etc. The active feedback is provided by a photodiode 88 that receives scattered light 90 from information gate 86 and sends a signal through power amplifier 92 to an impedance matching network 94 that includes a voltage controlled reactance 96 and an inductor 98.

By way of further explanation, the present invention may also be defined as a lamp with a sealed, light transmissive envelope, a high intensity discharge-producing electrode sealed within the envelope, and a ground for electric field lines emanating from the electrode during operation of the lamp that is provided in an ambient environment outside the envelope. That is, electric field lines are grounded outside the sealed envelope, in contrast to conventional double electrode HID lamps in which electric field lines extend to the other electrode that is also inside the sealed envelope. The ambient environment is that which surrounds an outside of the lamp during normal operation, and is typically air.

The lamp may also be mounted within an outer jacket to protect the oxidation reactive parts, particularly in the case PCA exposed niobium inleads. In this event, the outer jacket may hold a nitrogen fill gas or a vacuum. The ground electrode (e.g., reflector) may be outside the outer jacket.

While embodiments of the present invention have been described in the foregoing specification and drawings, it is to be understood that the present invention is defined by the following claims when read in light of the specification and drawings.

I claim:

1. A high intensity discharge (HID) lamp that has a starting gas, a vaporizable fill, and only one high intensity discharge-producing electrode sealed within a light transmissive envelope, said electrode being connected to an inlead that extends outside said envelope, and a ground adjacent to said envelope to which electric field lines emanating from said electrode return during operation of the lamp.

2. The lamp of claim 1, further comprising a source of high frequency power connected to said inlead.

3. The lamp of claim 2, wherein a frequency of said source of power is 2 MHz to 6 GHz.

4. The lamp of claim 2, further comprising a tuning element that matches lamp impedance during warm-up of the lamp and that is connected between said inlead and said source of high frequency power.

5. The lamp of claim 1, wherein said electrode is one of refractory metal and a ceramic.

6. The lamp of claim 1, further comprising a reflector and wherein said ground is a conductive surface of said reflector.

7. The lamp of claim 6, wherein said conductive surface is one of a metal, a conductive ceramic, a metal impregnated with ceramic, metallized ceramic, and a conductive coating.

8. The lamp of claim 6, wherein the conductive surface is indium tin oxide.

9. The lamp of claim 1, wherein said envelope is substantially spherical.

10. The lamp of claim 1, wherein said envelope comprises vitreous silica and is sealed with a foil seal.

11. The lamp of claim 1, wherein said envelope comprises a ceramic and is sealed with a frit seal and a cermet assembly.

12. The lamp of claim 1, wherein said envelope comprises a ceramic and is sealed with a frit seal and a wound rod inlead assembly.

13. The lamp of claim 1, wherein said starting gas is an inert gas and said vaporizable fill comprises mercury.

14. The lamp of claim 1, wherein said starting gas is an inert gas and said vaporizable fill comprises a volatizeable fill selected from the group consisting of sulfur, selenium, tellurium, and mixtures thereof.

15. The lamp of claim 1, wherein said starting gas is an inert gas and said vaporizable fill comprises a metal salt.

16. The lamp of claim 15, wherein said metal salt is selected from the group consisting of sodium metal salts and iodides of zinc, cadmium, thallium, aluminum, gallium, and indium.

17. A high intensity discharge (HID) lamp comprising a sealed, light transmissive envelope, a starting gas and a vaporizable fill sealed within said envelope, a high intensity discharge-producing electrode sealed within said envelope, and a ground in an ambient environment outside said envelope for electric field lines emanating from said electrode during operation of the lamp.

18. The lamp of claim 17, wherein said ground is an electrically conductive surface of a reflector for reflecting light emanating from said envelope.

19. The lamp of claim 17, wherein said electrode is directly connected to an inlead that extends outside said envelope.

20. A combination of a high intensity discharge (HID) lamp and a reflector adjacent to the lamp:

the lamp comprising an arc tube, a starting gas sealed within said tube, a vaporizable fill sealed within said tube, only one electrode sealed within said tube, and an inlead that is connected to said one electrode and that extends outside said tube, said one electrode producing a high intensity discharge during operation of the lamp; and the reflector comprising an electrically conductive surface that is a ground for electric field lines emanating from said one electrode during operation of the lamp.

21. The combination of claim 20, wherein said electrically conductive surface is an exterior surface of the reflector, light from the lamp being reflected from an interior surface of the reflector.

22. The combination of claim 20, further comprising a source of power that is connected to said inlead and that provides an amplitude modulated carrier in which the amplitude modulation is swept across a frequency range.

23. A method of operating a high intensity discharge (HID) lamp comprising the steps of:

applying high frequency power to an inlead that is connected to an electrode that is the only electrode sealed in a light transmissive envelope to cause an arc discharge in the envelope, the inlead extending outside the envelope, a starting gas and a vaporizable fill also being sealed with the envelope; and grounding electric field lines emanating from the electrode to a metal surface that is adjacent to the envelope.

24. The method of claim 23, wherein the metal surface is a surface of a reflector for the lamp.

25. The method of claim 23, further comprising the step of matching the lamp impedance during lamp warm-up.

26. The method of claim 23, wherein the high frequency power is an amplitude modulated carrier and further comprising the step of sweeping the amplitude modulation across a frequency range.

* * * * *